Patented Aug. 16, 1949

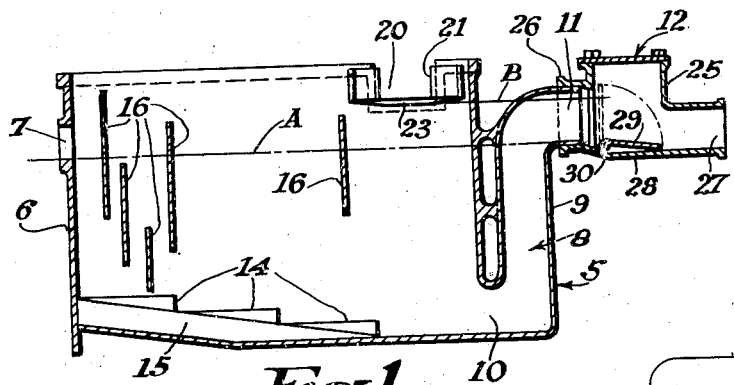
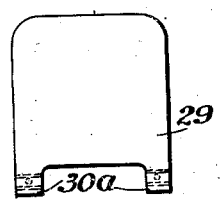
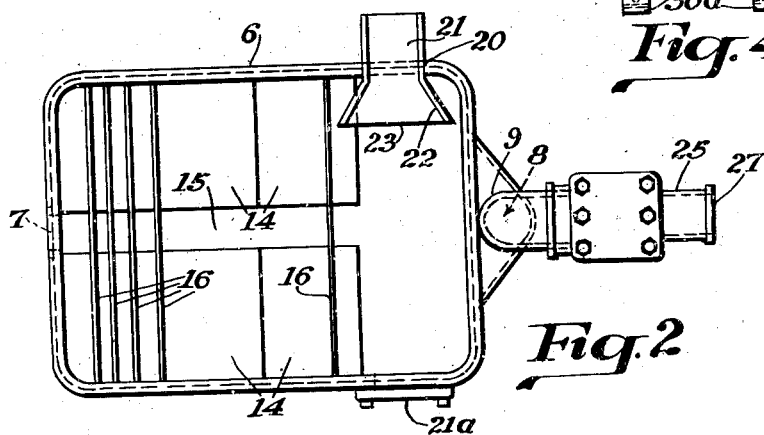
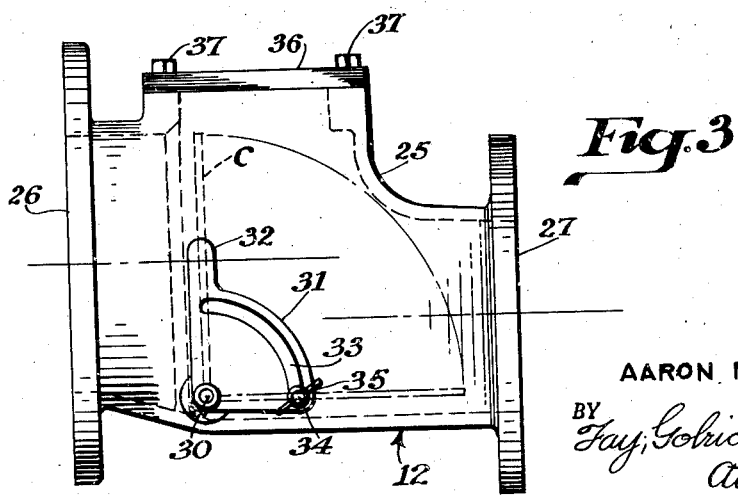

2,479,386

UNITED STATES PATENT OFFICE 2,479,386

GREASE INTERCEPTOR

Aaron Matheis, Michigan City, Ind., assignor to Josam Manufacturing Company, Cleveland, Ohio, a corporation of Delaware Application April 12, 1945, Serial No. 587,997

2 Claims. (Cl. 210—56)

The present invention relates to a grease interceptor, or the like, for removing grease or oil from waste water.

An object of the present invention is to provide a grease interceptor of the continuous flow type, in which the grease and other waste material may be easily removed from the interceptor at any desired time while maintaining normal flow operation of the interceptor.

Another object of the invention is to provide a grease interceptor in which the grease may be easily removed during normal operation thereof and in the event of an abnormal flow of waste water into the interceptor during the grease removing operation, the interceptor can be quickly returned to condition to accommodate such abnormal flow.

Other objects and advantages of the invention will be apparent from the following description of a preferred form of the invention, reference being had to the accompanying drawings wherein:

Fig. 1 is a longitudinal sectional view of a grease interceptor embodying my invention;

Fig. 2 is a top plan view of the interceptor shown in Fig. 1;

Fig. 3 is a side view in elevation of a valve employed in carrying out my invention; and Fig. 4 is a view in elevation of a valve plate.

Referring to the drawings, a heavy duty grease interceptor 5 of the continuous flow type is shown, which interceptor is particularly adaptable for use in separating greases and other waste material from the waste water of slaughter houses, packing houses, food processing plants and similar institutions where heavy grease laden waste water and drainage is discharged to the sewer lines. In general, the interceptor comprises a separating chamber into which the waste water flows and wherein the grease and other light density materials rise to the surface of the water in the chamber during the continuous flow of the burdened water. The chamber is provided with an outlet connected with the lower part of the chamber through a trap leg so that the clarified water may flow out of the chamber and into the sewage system. In separators of this type the static water level in the separating chamber varies in accordance with the amount of separated grease present in the separating chamber and if the grease accumulation becomes excessive the water flowing through the separator will cause the escape of the accumulated grease into the outlet of the device.

In order to remove the accumulated grease and other waste material from the surface of the liquid in the chamber a skimming trough extends into the chamber and has an open end thereof disposed above the normal level of the liquid and on a line approximately in a horizontal plane extending through the top edge of the outlet of the chamber. The body of accumulated grease is elevated by effecting a raising of the prevailing water level in the separating chamber, thus raising the grease level. The liquid level in the chamber may be raised by a gate member which is adapted to be adjustably positioned transversely of the outlet of the chamber so that the liquid level in the chamber may be raised as desired, thereby causing the accumulated grease to flow through the trough and out of the chamber, while avoiding the escape of waste water with the grease. The gate member is incapable of completely shutting off the waste water flow through the outlet of the chamber and water may flow over the top thereof when it is in its closed position so that removal of the accumulated grease may take place during waste water discharging periods to the interceptor. In the event that an abnormal drainage flow should occur during the skimming operation, the valve may be quickly manipulated to the fully open position so that the chamber may accommodate such abnormal flow without causing the waste water to discharge through the grease skimming trough.

In the form of the invention shown, the interceptor 5 is preferably formed of a rectangularly shaped open-top tank 6 which may be formed of steel plates welded together. The tank includes an inlet opening 7 at one end and at the opposite end a leg trap 8 is formed by a vertical tube 9 which is in communication with the tank 6 through an opening 10 at the bottom of the tank. The upper end of the tube 9 is turned in a horizontal direction and forms an outlet 11, and a valve mechanism 12 is mounted on the horizontal section. As may be seen by the line A of the drawings, the lower edge of the horizontal portion of the tube 9 is in the same horizontal plane as the lower edge of the inlet 7, although it may be below this plane, if desired.

The bottom of the tank 6 has cascades 14 and a channel 15 formed therein for producing a desirable action of the drain water emptied into the tank. Also, a series of transversely extending baffles 16 are provided in the tank for causing a more rapid separation of grease from the liquid in the tank. An opening 20 is formed in both sides of the tank 6 adjacent one end and the top thereof, and an open-end trough 21 extends through one of the openings 20 and into the tank while the opening 20 on the other side is closed with a plate 21a, a water-tight gasket, not shown, being interposed between the plate and tank wall. Preferably, the trough is flared at 22 and the lower lip 23 of the trough opening is disposed slightly below the upper edge of the outlet opening 11, as may be seen by line "B." The outer end of the trough 21 is adapted to discharge into a suitable grease collecting container, not shown.

The valve mechanism 12 comprises a casing 25 having a tubular inlet opening 26 which is mounted over the open end 11 of the tube 9 and an outlet 27 which is adapted to be connected with a sewer system, not shown. Preferably, the outlet 27 is the same size as the inlet 7. The bottom wall 28 of the casing is disposed below the lower edge of the inlet 26, and adjacent the lower edge of the inlet a rectangular valve plate 29 is pivoted by a pin 30 extending through and secured in bored lugs 30a formed at the bottom of the plate. The valve plate 29 is adapted to substantially block the inlet 26, but allowing some water flow thereabout. The pin 30 is journalled at opposite ends in openings in the wall of the casing 12, and one end of the pin extends through the wall of the casing and a quadrant 31 is fixedly attached to the pin. Suitable packing, not shown, is provided in the opening through the casing and about the pin for preventing leakage. The quadrant 31, which may be formed of a metallic plate, includes a handle 32 and a 90° arcuate slot 33 is formed in the quadrant. Preferably, the handle 32 lies in a plane common to the plane of the face of the plate 29 so that the position of the plate 29 can be readily ascertained by noting the position of handle 32. The quadrant 31 may be locked in any desired position by the frictional engagement thereof by wing nut 34 threaded on a pin 35 extending through the slot 33 and anchored in the wall of the casing. The lower end of slot 33 and the pin 35 limit movement of the plate 27 toward the outlet of the tank 6 so that water may always flow over the top of the plate, although the plate is in the closed position. Preferably, the quadrant may be removable from the pin so that it can be secured to the opposite end of the pin on the opposite side of the valve, if desired.

Preferably, the top of the casing 25 has an opening which is normally closed by a plate 36 secured over the opening by bolts 37. Thus, access may be had to the valve mechanism through the opening in the top of the casing.

During the normal operation of the interceptor the liquid level in the tank 6 will be that indicated by line "A," i. e., even with the lower edge of outlet 11, or slightly above this level during the time waste water is emptied into the tank. The valve plate 29 is normally in the open position as shown in Fig. 1 in full lines and a free discharge through the opening 11 may be had. During this time the liquid level will be well below the level of the bottom of the trough 21. When it is desirable to remove the grease and other waste material from the tank, the valve plate 29 is raised about the pivot pin 30 by the handle 32 so that considerable restriction is provided at the outlet 11, thereby causing the level in the tank 6 to rise. It will be noted by reference to Fig. 3 that when the valve member 29 is in its raised position, as indicated at C, liquid may flow over the top of the valve member. The raising of the liquid level will cause the grease to flow out through the trough 21 and into a suitable container. The waste material may also be removed by a paddle or hoe through the trough 21 should the consistency thereof be sluggish.

In the event an abnormal surge of drainage is emptied into the tank 6, the operator may quickly release the wing nut 34 and the valve 29 will fall to its open position before the level of the liquid rises to the point where it would flow through the trough 21.

Thus, it is apparent that I have provided a grease interceptor from which the grease and waste may be removed without the necessity of closing off the interceptor. Also, during the cleaning operation, the interceptor may be quickly rendered effective to handle abnormal flows without spilling over into the grease collection container.

I am aware of prior efforts to remove grease from a grease separating chamber by causing an elevation of the prevailing water level in the separating chamber by closing the separator outlet and partially closing the inlet. However, such attempts have resulted in the necessity of providing a by-pass conduit or another interceptor unit to take care of excess inflow and which was discharged to the sewer line with its grease burden.

I claim:

1. A grease interceptor including a waste water chamber having an inlet in the upper portion thereof, a discharge passage leading from the lower portion of the chamber upwardly and discharging at a level to maintain a substantial body of liquid in the chamber, a valve casing carried by the wall of the chamber and having an inlet for receiving the discharge from said passage, a gate valve pivoted in said casing and movable toward and away from the end of said discharge passage to control the flow therethrough, manually operated means on the exterior of said chamber for actuating said gate and means for limiting movement of said valve toward closing position so that the valve may not be completely closed, and an open ended skimming trough member having a flared mouth extending into said chamber between the inlet and discharge thereof with the end of the bottom of said trough in the chamber being disposed slightly above the normal liquid level in the chamber.

2. A grease interceptor as claimed in claim 1 in which said limiting means comprises a plate secured to said pivot exteriorly of the chamber, and is provided with an arcuate slot, and a pin on said chamber wall extending through said slot and engaging an end thereof to stop the movement of the valve before it is completely closed.

AARON MATHEIS.

(References on following page)

REFERENCES CITED

The following references are of record in the file of this patent:

UNITED STATES PATENTS

| Number | Name | Date |
|---|---|---|
| 123,663 | Anderson | Feb. 13, 1872 |
| 167,397 | Franke | Sept. 7, 1875 |
| 168,191 | Slaney | Sept. 28, 1875 |
| 748,981 | Oliver | Jan. 5, 1904 |
| 787,565 | Coryell et al. | Apr. 18, 1905 |
| 911,314 | Maranville | Feb. 2, 1909 |
| 1,059,037 | Collar | Apr. 15, 1913 |
| 1,095,409 | Mann et al. | May 5, 1914 |
| 1,307,686 | Linden | June 24, 1919 |
| 1,850,094 | Dean | Mar. 22, 1932 |
| 1,904,916 | Coombs | Apr. 18, 1933 |
| 2,022,118 | Loeb | Nov. 26, 1935 |
| 2,186,371 | Durdin | Jan. 9, 1940 |

FOREIGN PATENTS

| Number | Country | Date |
|---|---|---|
| 9,770 | Great Britain | 1913 |
| 505,300 | Great Britain | May 9, 1939 |
| 448,721 | Germany | Aug. 23, 1927 |
| 17,079 | Sweden | Feb. 13, 1904 |